July 23, 1968  O. MUELLER  3,393,583
SELF-LOCKING DIFFERENTIAL TRANSMISSION
Filed Feb. 13, 1967  3 Sheets-Sheet 1

INVENTOR
OTTO MUELLER

BY Olsen and Stephenson
ATTORNEYS

July 23, 1968  O. MUELLER  3,393,583

SELF-LOCKING DIFFERENTIAL TRANSMISSION

Filed Feb. 13, 1967  3 Sheets-Sheet 2

INVENTOR
OTTO MUELLER

BY Olsen and Stephenson
ATTORNEYS

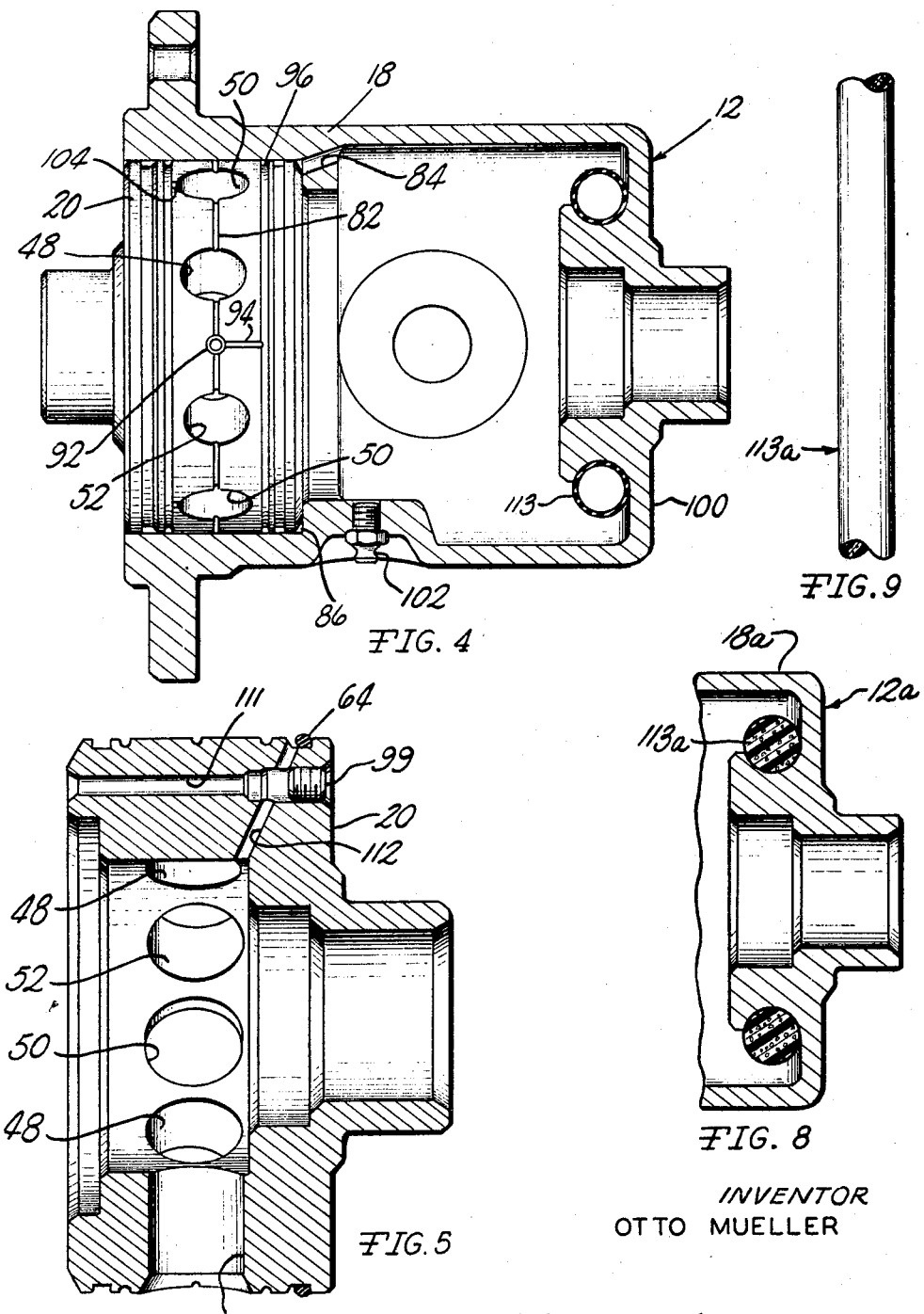

United States Patent Office 3,393,583
Patented July 23, 1968

3,393,583
SELF-LOCKING DIFFERENTIAL TRANSMISSION
Otto Mueller, 13 Byfield Lane,
Dearborn, Mich. 48120
Continuation-in-part of application Ser. No. 568,549,
July 28, 1966. This application Feb. 13, 1967, Ser.
No. 615,484
11 Claims. (Cl. 74—711)

ABSTRACT OF THE DISCLOSURE

A differential transmission for automobiles having in the differential case an hydraulic mechanism responsive to relative turning of side gears of the transmission for regulating in a desired manner the distribution of torque to the output shafts which are adapted to be connected to the side gears.

Cross references to related applications

This application relates in some respects to disclosures appearing in copending application, Ser. No. 568,549, filed July 28, 1966 and is a continuation-in-part thereof.

Background of the invention

The present invention pertains to gearing of the differential type having plural power paths from the gearing, and more particularly to differential transmissions of this type which are used in the automotive field. In particular, the invention relates to a differential transmission which is self-locking under prescribed conditions by means of an hydraulic locking mechanism having a closed hydraulic system within the differential casing. One such differential transmission is disclosed in United States Letters Patent No. 3,230,795. Another such differential is shown in the aforesaid copending application Ser. No. 568,549.

In the differential transmissions shown in the aforesaid prior patent and aforesaid copending application, the hydraulic system receives hydraulic fluid from the housing for the differential transmission, and suitable pumping means are provided to maintain the casing of the differential substantially filled with hydraulic fluid. One of the problems that may be encountered when using a differential transmission of the foregoing types is that under certain extreme conditions the locking action will not function in the intended manner. It has now been discovered that air may be entrained in the hydraulic fluid by virtue of turning action of the gears or due to other conditions that may cause air to be present in the casing, and such air whether entrained or in the form of larger bubbles may be transferred into the hydraulic system thereby reducing the effectiveness of the hydraulic mechanism.

The problems involved in the prior art have been solved by the present invention in a unique manner. It has been discovered that the problem of entrained air in the hydraulic system can be eliminated if the casing can be maintained filled with hydraulic fluid to the exclusion of air or gases. However, this has not been a simple matter to accomplish, because when the motor vehicle in which the differential transmission forms a part is in use, the temperature of the hydraulic fluid will vary substantially. Like all fluids, oil expands when heated, and the extent of expansion varies with the number of degrees temperature through which the fluid is heated. This expansion can be considerable and one of the features of the present invention is that means have been provided in the differential case to accommodate such expansion. Thus, the actual expansion of one form of oil in a given situation can be calculated from the equation.

Percent increase in Volume=0.035×Rise in Temperature (° F.)

From this equation it will be recognized that if the temperature of the hydraulic fluid in the casing rises 100° from its coldest condition to its warmest condition, the increase in volume without an increase in pressure will constitute 3.5%. When it is borne in mind that the casing is a sealed unit, it will be recognized that the pressure of the fluid under these conditions will increase a very substantial amount in view of the fact that the casing as previously used is a fixed volume which does not allow for the expansion of the hydraulic fluid. Such high pressures within the casing will have the effect of destroying the seals, or it will be necessary to develop high pressure seals which will increase the cost of the differential transmission beyond a reasonable amount.

Summary of invention

According to one form of the present invention, these problems have been solved by hermetically sealing the differential casing, filling the casing with hydraulic fluid, and providing in the casing a compressible member positioned coaxially of the side gears and seated at one end of the casing. When temperature changes occur, the member will absorb substantially all of the expansion of the oil that may occur so that substantially no change in pressure of the fluid within the casing will occur. Such slight increases in pressure that may occur are immaterial from the standpoint of effecting the seals of the casing.

Another feature of the present invention is disclosed in the aforesaid copending application Ser. No. 568,549 in providing an hydraulic mechanism having a unique arrangement of pressure cylinders which travel on a cam surface and in which the pressure cylinders and associated pistons cooperate in sets in such a manner that the volumetric displacement of one piston of a set for any selected time interval is substantially equal to the algebraic sum of the volumetric displacement of the other pistons of the same set. By virtue of this arrangement, the hydraulic mechanism is designed so that the differential transmission functions smoothly and without noise.

In order to simplify the hydraulic circuit and the numbers of parts that are necessary in the hydraulic systems shown in the aforesaid patent and copending application, an improved circuitry for the hydraulic fluid is also provided, which is particularly adapted for use with a sealed system of the type embodied in the present invention.

With the foregoing in mind, it is an object of the present invention to provide a differential transmission which is constructed and arranged to be self-locking to a controlled extent, and particularly one which employs an hydraulic mechanism for effecting the locking action of the transmission.

It is another object of the present invention to provide a differential transmission of the foregoing character which is constructed and arranged so that the problem of trapped or entrained air in the hydraulic fluid of the system is eliminated.

It is another object of the present invention to provide an hydraulic locking differential of the foregoing character which is constructed and arranged so that it is characterized by its smooth and silent operation.

Other objects of this invention will appear in the following description and appended calims, reference being had to the accompanying drawings forming a part of this specification wherein like reference characters designate corresponding parts in the several views.

In the drawings:

FIGURE 4 is a fragmentary sectional view of the transmission taken on the line 4—4 of FIGURE 3;

FIGURE 5 is a sectional view taken on the line 5—5 of FIGURE 2, showing one section of the casing in which the major portions of the hydraulic mechanism are contained;

FIGURE 8 is a fragmentary section, similar to FIGURE 4, but showing a preferred modification of a compensator for accommodating volumetric changes of hydraulic fluid in the differential casing; and FIGURE 9 is a side elevational view of the compensator of FIGURE 8 prior to being inserted in the casing.

Figure 1:
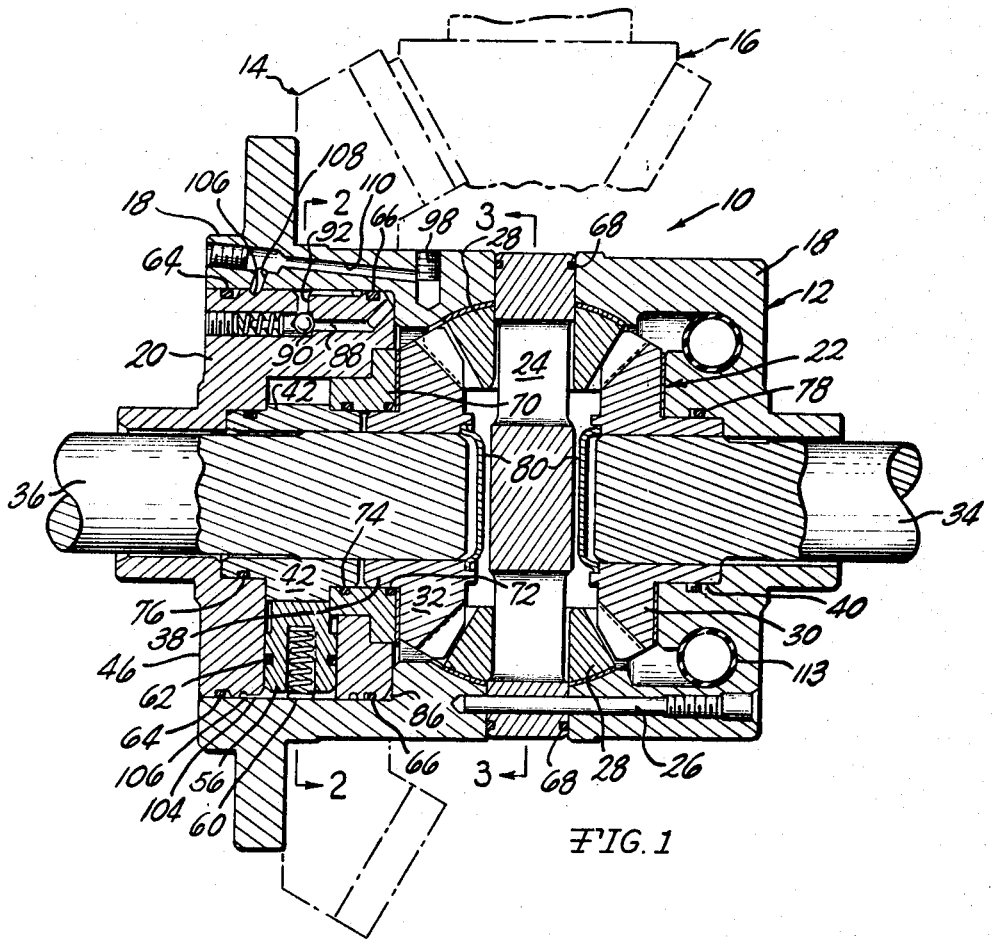
FIGURE 1 is a sectional view of one form of a differential transmission embodying the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the illustrated embodiment of the invention will now be described in greater detail. The differential transmission 10 has a differential case or casing 12 which supports in the conventional manner a ring gear 14 which is adapted to be driven by a drive pinion 16. The differential case 12 is formed in two sections 18 and 20, and such sections are formed so that the outer configuration of the differential case 12 is substantially the same as that of conventional differentials used heretofore.

Supported within the differential case 12 is a set of differential elements or gears 22 which is mounted within the differential case 12 for receiving the input torque from the drive pinion 16. The differential gear set 22 includes a pinion shaft 24 which extends through the case 12 and is secured in place therein by the screws 26. Mounted on the pinion shaft 24 for rotation are the pinion gears 28. Thus, by virtue of the manner in which the pinion shaft 24 is mounted in the differential case 12, the assembly comprising the pinion shaft 24 and the pinion gears 28 is adapted to rotate with the differential case 12, in the conventional manner.

Figure 2:
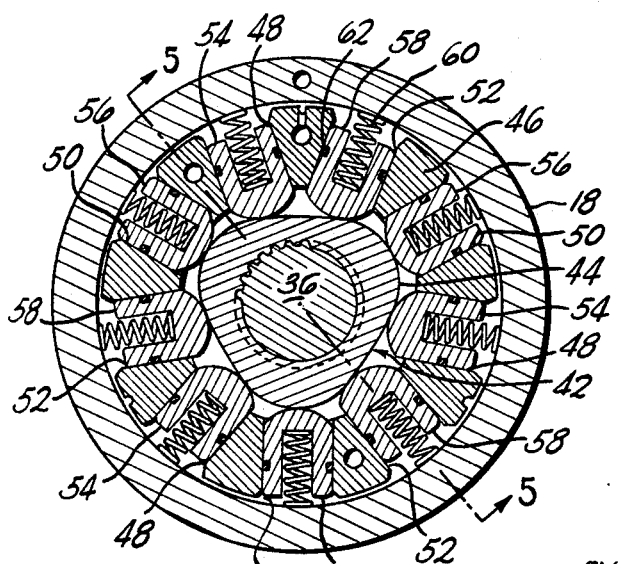
FIGURE 2 is a sectional view of the differential transmission taken on the line 2—2 of FIGURE 1.
Figure 3:
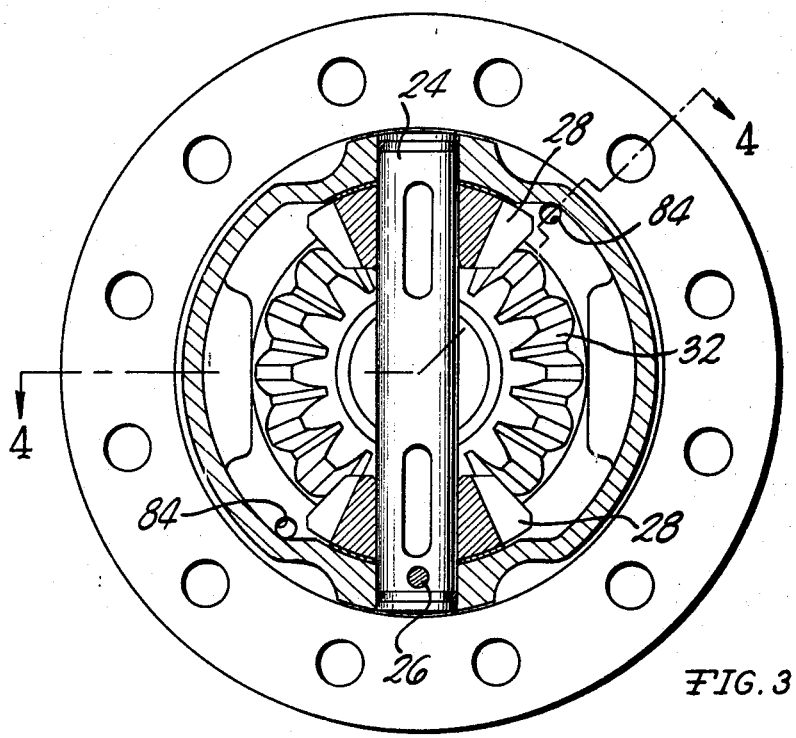
FIGURE 3 is a sectional view of the differential transmission, taken on the line 3—3 of FIGURE 1.

Also forming a portion of the differential gear set 22 are the side gears 30 and 32 whose teeth are in mesh with the pinion gears 28. These side gears 30 and 32 also have internal splines for receiving the splined ends of the driven axle shafts 34 and 36. The side gears 30 and 32 are conventional in construction except that the side gear 32 has a hub portion 38 which is or may be slightly shorter than the hub portion 40 of the other side gear 30. Formed adjacent to the side gear 32 is another rotatable differential element 42 which is an annular member having internal splines so that it also can be secured onto the splined end of the axle shaft 36 for rotation together with the axle shaft 36 and side gear 32. Thus, the annular member or rotatable differential element 42 functions as an integral extension of the side gear 32, but is made a separable part primarily for manufacture purposes. As can be seen in FIGURE 2 of the drawings, the annular member 42 has around its outer periphery a plurality of radially directed rise and fall cam surfaces 44. In the illustrated embodiment, three equiangular rise and fall portions are utilized. The three portions are arranged so that they will provide both dynamic and static balance.

The portion of annular member 42 which contains the cam surfaces 44 is located radially inwardly of a complementary portion 46 in the section 20 of casing 12. In the complementary portion 46 are located a plurality of radially inwardly directed, circumferential aligned pressure chambers 48, 50 and 52 which are closed at their outer ends by the inner circumference of section 18 of case 12. The chambers 48 comprise a first set of chambers, the chambers 50 comprise a second set of chambers, and the chambers 52 comprise a third set of chambers. Located within the pressure chambers 48, 50 and 52 are pistons 54, 56 and 58 which are adapted to reciprocate therein, and these pistons are also in first, second and third sets. The radially inner ends of pistons 54, 56 and 58 are contoured to provide a maximum contact while traveling on the cam surface 44. The pistons 54, 56 and 58 have hollow interiors in which are located coil springs 60 for biasing the pistons against the cam surface 44 so that the pistons will reciprocate upon rotation of the annular member 42 relative to the casing 12. By virtue of the springs 60, the pistons will reciprocate irrespective of whether or not fluid is present in the chambers, for a purpose which presently will be described. The pistons 54, 56 and 58 also have annular grooves around their circumferences in which are located O-rings 62 for providing a more effective seal between the pistons and the walls of the pressure chambers during reciprocation of the pistons.

In order to provide fluid tight joints between the casing sections 18 and 20, grooves are formed in the outer periphery of the section 20 and in these grooves are located sealing or O-rings 64 and 66. As previously indicated, the casing 12 is designed so as to be a hermetically sealed unit, and for this purpose, a plurality of other O-rings are used as sealing members. Thus, annular grooves are formed in the opposite ends of the pinion shaft 24 in which are fitted a pair of sealing rings 68. Also, the supporting ring 70 has grooves around its inner circumference in which are supported the O-rings 72 and 74. Likewise, the annular member 42 has a groove around its outer periphery in which is seated an O-ring 76 for providing a seal between annular member 42 and the casing section 20. Another O-ring 78 is located in the groove in the section 18 to provide a seal between side gear 30 and casing section 18. Thus, it can be seen that seals are provided between all of the various movable elements where leakage could occur to prevent loss of hydraulic fluid from within the casing 12. In order to prevent loss of the fluid between the splines in the shafts 34 and 36, seal caps 80 are provided in the inner ends of the side gears 30 and 32. A suitable plastic bond is used with the seal caps 80.

Figure 6:
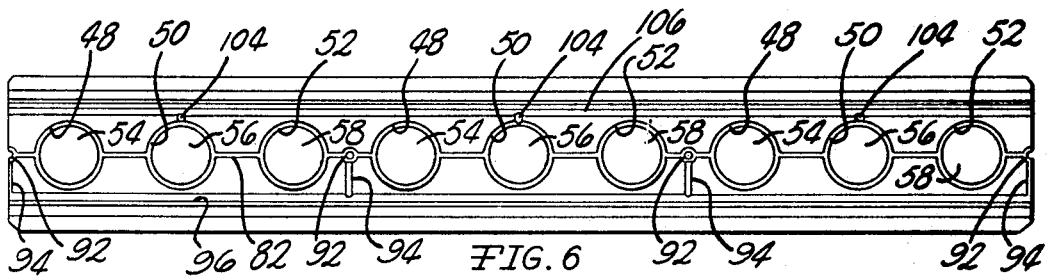
FIGURE 6 is a developed view of the circumferential surface of the casing member of FIGURE 5.

From the foregoing description, it will be understood that the pistons 54, 56, and 58 reciprocate in their respective chambers when the side gear 32 rotates relative to the differential casing 12. When the associated chambers are filled with hydraulic fluid, such reciprocation can occur by virtue of passage means for permitting pumping of the hydraulic fluids in and out of such chambers. In the present embodiment of the invention an annular passageway or duct 82 is provided for this purpose which passes centrally through each of the pressure chambers as can be seen best in FIGURE 6. By virtue of this arrangement, the hydraulic fluids in the pressure chambers are pumped back and forth between one another at a rate permitted by the dimensions of the passageway 82. Thus, the passageway 82 is construed to be a flow control groove which allows differential action to occur between the shafts 34 and 36 at the rate permitted by the flow characteristics of this groove.

As previously indicated, the differential case 12 normally will be completely filled with hydraulic fluid to the exclusion of any air. Under these circumstances there will be no problem arising from entrained air being passed between the various chambers during pumping action of the pistons; and by virtue of the pistons pumping only hydraulic fluid, positive and definite characteristics will be achieved in the way of controlling the differential action that is desired between the shafts 34 and 36.

Should the pumping pressure within the pressure chambers become sufficiently great so that leakage occurs from these chambers back to the interior of the casing 12, means are provided for replenishing the hydraulic fluid within the pressure chambers. If such need for replenishing occurs, the pistons 54, 56 and 58 will act as the pumps to draw hydraulic fluid from the interior of the differential case 12 through either of the diametrically opposed ducts 84, see FIGURE 4, through the annular passageway 86 formed between the sections 18 and 20, then through the passageway 88 formed in section 20, then past the ball check valve 90, through the outwardly directed passageway 92 to the groove 82. The passageways 94 and 96 are in communicaton with passageway 92 for performing a different function, which will presently be described. The passageways 94 and 96 are used primarily for initially filling the casing completely with hydraulic fluid, to the exclusion of air, and the procedure for charging the differential case 12 with the hydraulic fluid will now be described.

When charging the differential case 12 with the hydraulic fluid, the bleed-off plugs 98 and 99 will be removed, and the differential case 12 will be mounted with its axis in a vertical position and with the one side 100, see FIGURE 4, in the lowermost position. A fill line, not shown, is then attached to the lubricating fitting 102 and the hydraulic fluid or lubricant is pumped into the casing through this fitting. The filling operation is at such a rate so that the hydraulic fluid will fill the casing at a rate to permit the air within the casing to be discharged upwardly through the two ducts 84 into the annular passageway 86, through the duct 88, past the ball valve 90 through the passageways 92, 94, 96 to chambers 48, 50 and 52, until such time as these chambers are filled with hydraulic fluid. As the chambers are filled with hydraulic fluid, the air within the chambers will flow from chambers 48 and 52 to chamber 50 and through ducts 104 into the annular groove 106 from which the air can pass radially outwardly via duct 108 to the passageway 110 which discharges through the opening normally closed by the bleed-off plug 98. The air from within the casing can also flow through duct 111, FIGURE 5, and duct 112 through the openings normally closed by bleed-off plugs 99.

Other procedures can be followed for charging the casing with hydraulic fluid to the exclusion of air. Thus, a vacuum line may be connected to the vent hole normally closed by plug 99 and a fluid supply line can be connected to fitting 102. Air can then be withdrawn from the casing followed by hydraulic fluid being admitted at a pressure corresponding to atmospheric pressure at approximately 20° F.

From the foregoing description it will be understood that in the normal operation of the differential transmission 10, the differential case will always be filled with hydraulic fluid to the exclusion of any air. Thus, it will be necessary that means be provided within the differential case 12 to compensate for volumetric changes which occur to the hydraulic fluid due to temperature variations. When it is kept in mind that the temperature of the hydraulic fluid within the case 12 may easily vary in excess of 200° F., means must be provided to compensate for the volumetric changes of the hydraulic fluid due to such temperature changes. Failure to provide such means will result in extremely high pressures being created within the casing 12 which may produce leaks at the various seals, and if such seals are constructed so as to withstand the high pressures, the cost of the differential unit will be unnecessarily high. In the embodiment of the invention shown in FIGURES 1-7, a volumetric compensator 113 has been provided which is a hollow torus filled with air and constructed of any suitable rubber-like material which will not allow diffusion of air therethrough and which can be compressed to absorb the volumetric expansion of the hydraulic fluid caused by temperature variations. Thus, the volumetric compensator 113 will function to maintain the pressure within the differential case substantially constant at all times. In the illustrated embodiment of the invention, the volumeric compensator is seated in a recess formed at one end of the differential case 12, coaxially of the side gears 30 and 32. However, it will be understood that any other location of the volumetric compensator can be employed which can function to maintain the pressure within the differential case substantially constant at all times. Also, other forms of compensators may be used, one such compensator being shown in FIGURES 8 and 9 and described hereinafter.

It will be observed that in the embodiment of the invention shown in FIGURES 1-7, a total of nine pressure chambers are arranged equiangularly about the axis of rotation of the cam surfaces 44 so that the pressure chambers are disopsed 40° apart. The cam surfaces 44 are shaped so that when relative rotation occurs between said casing 12 and side gear 32, the pistons in each set reciprocate out of phase with the pistons of the other sets and transfer the fluid back and forth between the chambers via the passage means 82 and to the extent permitted by the dimensions of this passage means. The pressure chambers and the cam surfaces are constructed and arranged so that when relative rotation occurs between said casing and the side gear, the volumetric displacement of one set of pistons for any selected time interval is substantially equal to the algebraic sum of the volumetric displacement of the other two sets of pistons.

Figure 7:
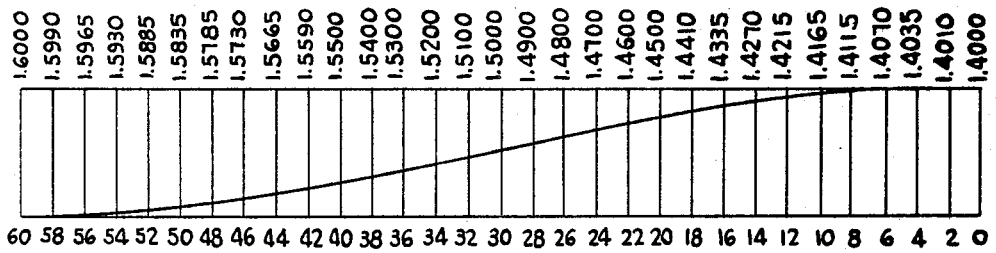
FIGURE 7 is a developed profile of the 60° of the cam surface showing the extent of rise or fall with respect to the cam.

One example of a configuration of a portion of a cam surface which is constructed to perform in this manner can be seen in FIGURE 7. The shape of the cam surface 44 is shown in a developed form, and it will be observed that the numbers extending across the bottom of the figure represent 60° of cam surface. The numbers at the top of the figure represent the cam rise and fall from its maximum to its minimum position as determined from a base point position. Thus, the total rise is 0.2. In view of the fact that the pistons are located 40° apart, it can be determined readily that if the rise or fall cam dimensions are selected at 40° intervals the total for any such three figures selected will be a constant of 4.5. Thus, if one of the pistons is located at the 0° point, its dimension from base position is 1.4000, the next piston will be located at the 40° point, and for this position the dimension from the base position will be 1.5500, and the next piston will be located at a point corresponding to 80°, which will again be a dimension of 1.5500. This latter dimension can be obtained by returning 20° from 60° position. By totaling the three dimensions, it will be observed that the total is 4.5. Similarly, if the rise or fall cam figure is taken at 8°, at 48° and at 88°, it will be found that the cam rise or fall figures represent 1.4115, 1.5785 and 1.5100. When these figures are added together it will again be observed that the sum is 4.5. Thus, if the positions are reciprocating, the volume of fluid being displaced is always a constant. This has the effect of maintaining a substantially constant pressure throughout the system whenever relative rotation occurs between the casing 12 and the side gear 32. Such an arrangement is found to be particularly desirable because it substantially eliminates noise and also improves the operational characteristics of the differential transmission. It is believed to be readily apparent that when a more simplified form of the present invention is employed wherein only two sets of pistons and associated pressure chambers are employed as disclosed in U.S. Patent No. 3,230,795, the torque value in such closed system fluctuates between a condition of substantially no torque at that instant of time when the flow of fluid between the two sets of pressure chambers is being reversed, to a desired maximum torque when the fluid is being transferred in one direction from the one set of pressure chambers to the other set of pressure chambers. Thus, in the simplified form the torque bias value is reduced considerably at the instant when the flow of fluid between the two sets of pressure chambers is being reversed.

From the foregoing description it will be understood that a smooth and quiet operating differential is provided which is free of problems of entrained air in the hydraulic circuitry in the hydraulic locking mechanism. The unit is sealed and means are provided therein for compensating for volumetric changes due to temperature variations. Further, if there is leakage between the sections 18 and 20 to the region of the O-ring 64, the hydraulic fluid will pass into the groove containing the O-ring 64 where it can return through the duct 114 to the interior of the casing 12. Naturally, if the leakage occurs in the other direction toward the O-ring 66, no problem is encountered, because fluid can flow only to the interior of the casing.

Attention is now directed to FIGURES 8 and 9 for a description of a modified form of a volumetric compensator that can be used in the differential. In this embodiment the volumetric compensator 113a is retained in place in the illustrated annular channel which is located in one end of the section 18a of the case 12a. The compensator 113a is formed from a suitable closed cellular elastic material and the closed cells are filled with nitrogen. The compensator 113a can be formed from an endless flexible rod of material by cutting such rod into suitable lengths, such as is shown in FIGURE 9. The cut rods can then be inserted into the annular channel of section 18a. Suitable synthetic materials, such as neoprene may be used in the manufacture of the endless rod from which the compensator 113a is derived. One of the advantages in using a compensator of this character is that the gas in the closed cells will not readily diffuse into the hydraulic fluid so that the compensator looses its effectiveness.

It will be understood by those skilled in the art that other volumetric compensators can be used within the scope of the present invention. Thus, a suitable diaphragm, spring or air-loaded piston, bellows or similar structure may be used which will provide accommodating means for the volumetric expansion of the hydraulic fluid. Further, the compensator may be located within the differential case or at a remote location in communication with the interior of the differential case.

Having thus described my invention, I claim:

1. A differential transmission having a casing for transmitting an input torque, a plurality of pinion gears carried by said casing, a pair of side gears in mesh with said pinion gears and adapted to be drivingly connected to the inner ends of axially aligned output shafts, and an hydraulic mechanism in said casing having a closed hydraulic circuit and being responsive to relative turning of said side gears to restrict relative turning of one of said gears, wherein the improvement comprises said casing being filled to the exclusion of air with hydraulic fluid as a source for replenishing the closed circuit and as a lubricant for said gears, and means in communication with the interior of said casing for maintaining the pressure of the hydraulic fluid of said source substantially contant irrespective of temperature changes that may occur to said source of hydraulic fluid.

2. A differential transmission according to claim 1, wherein said means comprises a sealed collapsible unit containing gas adapted to be compressed in the event temperature increases cause expansion of the hydraulic fluid of said source.

3. A differential transmission according to claim 2, wherein said sealed collapsible unit is a torus-shaped member seated coaxially of said shafts in one end of said casing.

4. A differential transmission according to claim 1, wherein seal caps cover the inner ends of said side gears to prevent loss of hydraulic fluid through splined bores thereof.

5. A differential transmission according to claim 1, wherein said hydraulic mechanism includes means to replenish the hydraulic circuit with fluid within said casing if the hydraulic circuit should lose fluids during normal operation.

6. A differential transmission according to claim 2, wherein said sealed collapsible unit is a closed cellular member seated within the casing.

7. A differential transmission having a casing for transmitting an input torque, a set of rotatable differential elements mounted in said casing one of said rotatable differential elements and said casing having radially facing circumferential portions, one of said portions including a plurality of radially directed pressure chambers facing the other portion and containing fluid, the other of said portions including radially directed rise and fall cam surfaces, and pistons in said pressure chambers operatively engaging said cam surfaces for reciprocation in response to rotation of said one rotatable differential element relative to said casing, wherein the improvement comprises said pressure chambers being in at least three sets, restrictive passage means providing fluid communication between each set of pressure chambers and each of the other sets of pressure chambers, said pressure chambers and said cam surfaces being arranged so that when relative rotation occurs between said casing and said one element the pistons in each set reciprocate out of phase with the pistons of the other sets and transfer the fluid in the pressure chambers back and forth therebetween via said passage means to the extent permitted by said passage means, said casing and its associated parts defining a hermetically sealed compartment and said casing being filled with hydraulic fluid to the exclusion of air as a source for replenishing the fluid in said chambers and in said restrictive passage means, and means operatively associated with said casing maintaining the pressure of the hydraulic fluid of said source substantially constant irrespective of temperature changes that may occur to said source of hydraulic fluid.

8. A differential transmission according to claim 7, wherein the pressure chambers and said cam surfaces are arranged so that when relative rotation occurs between said casing and said one element the volumetric displacement of one set of pistons for any such relative rotation is substantially equal to the algebraic sum of the volumetric displacement of the other two sets of pistons.

9. A differential transmission according to claim 9, wherein said rise and fall cam surfaces are at least three in number which are equiangularly arranged around said other portion.

10. A differential transmission according to claim 9, wherein the pressure chambers in each set are equiangularly arranged around said one portion and the angular displacement between adjacent pressure chambers is constant.

11. A differential transmission according to claim 7, wherein said casing comprises two sections secured together, one of said sections being a cylindrical annulus fitted into the end of the other section and embodying on its radially inner circumference one of said radially facing portions.

References Cited

UNITED STATES PATENTS

| | | | |
|---|---|---|---|
| 2,627,190 | 2/1953 | Bottcher | 74—711 |
| 2,775,141 | 12/1956 | Ronning | 74—711 |
| 2,978,929 | 4/1961 | Roberts | 74—711 |
| 3,059,745 | 10/1962 | Tauschek. | |
| 3,158,042 | 11/1964 | Saurer | 74—711 |
| 3,230,795 | 1/1966 | Mueller | 74—711 |
| 3,262,527 | 7/1966 | Allaben. | |

ARTHUR T. McKEON, *Primary Examiner.*

UNITED STATES PATENT OFFICE
CERTIFICATE OF CORRECTION

Patent No. 3,393,583                          July 23, 1968

Otto Mueller

It is certified that error appears in the above identified patent and that said Letters Patent are hereby corrected as shown below:

Column 4, line 3, "circumferential" should read -- circumferentially --. Column 6, line 8, "volumeric" should read -- volumetric --; line 21, "disopsed" should read -- disposed --; line 61, "positions" should read -- pistons --. Column 8, line 49, the claim reference numeral "9" should read -- 8 --.

Signed and sealed this 18th day of November 1969.

(SEAL)
Attest:

Edward M. Fletcher, Jr.                    WILLIAM E. SCHUYLER, JR.
Attesting Officer                             Commissioner of Patents